L. P. HAWES.
Steam-Trap.

No. 208,520.  Patented Oct. 1, 1878.

Witnesses
Chas. H. Smith
Geo. T. Pinckney

Inventor
Loring P. Hawes
per Lemuel W. Serrell
Atty.

UNITED STATES PATENT OFFICE.

LORING P. HAWES, OF BROOKLYN, NEW YORK.

IMPROVEMENT IN STEAM-TRAPS.

Specification forming part of Letters Patent No. 208,520, dated October 1, 1878; application filed August 28, 1878.

*To all whom it may concern:*

Be it known that I, LORING P. HAWES, of Brooklyn, in the county of Kings and State of New York, have invented an Improvement in Steam-Traps for Removing Air and Water of Condensation, of which the following is a specification:

Vessels have been made use of containing alcohol or other volatile material that under changes of temperature expands to close the outlet by the metal of the vessel springing under the increase of pressure. Traps of this character may be seen in Letters Patent Nos. 122,272 and 141,063. In these cases the vessel containing the expansible material was within an outer case, and hence did not part with its caloric with the desired rapidity.

Steam-traps have also been made with two diaphragms and an external case surrounding such diaphragms, with expansible material between.

My improvement relates to an expansion steam-trap with one diaphragm and an external case extending from one edge of the diaphragm across to the other, and inclosing nearly a hemispherical space containing the expansible material, in combination with the tube through which the water of condensation escapes toward the diaphragm and the case that surrounds such tube and forms the escape-chamber.

By this construction the expansion-chamber is easily heated from below the diaphragm, and parts freely with its heat in an upward direction, because the entire upper part of the expansion-chamber is exposed. Hence my trap is very sensitive to different changes of temperature, and opens to allow the water of condensation or air to escape; but closes instantly when the steam strikes the diaphragm.

Figure 1:
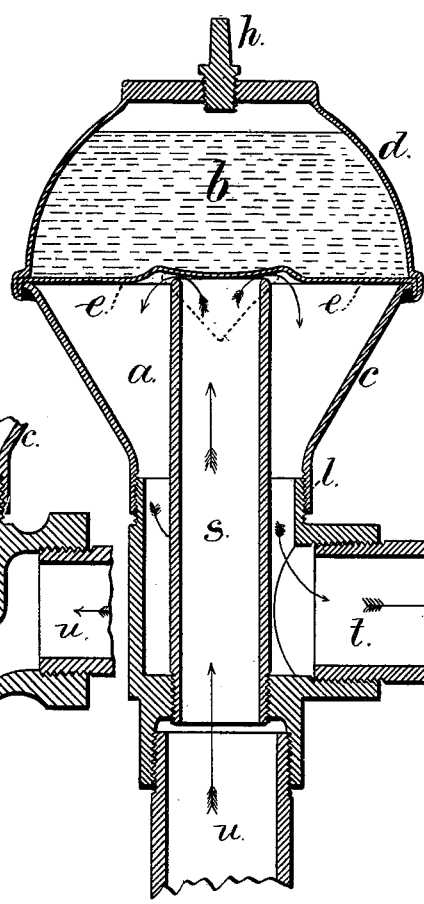
Figure 2:
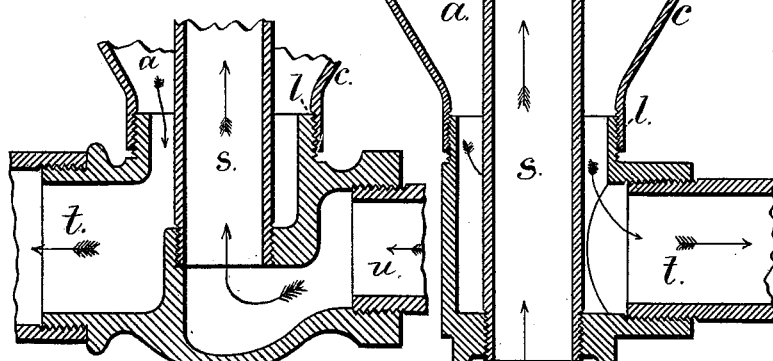

In the drawing, Figure 1 is a vertical section of my improved trap, and Fig. 2 is a partial section of the line-pipe connection.

The trap is made of two principal parts—the escape-chamber $a$, for the water of condensation, and the expansion-chamber $b$, for the liquid or other material that is acted upon by changes of temperature. The case inclosing these two chambers is made of the parts $c$ and $d$, between which is the diaphragm $e$. I prefer and use a case of the shape shown; but I do not limit myself in this particular, and by experiment I have found that a diaphragm of thin sheet metal stamped up or spun into the shape shown yields to the pressure, and will spring back without injury.

It is preferable to make the diaphragm with a narrow cylindrical rim around its edge, that sits within a similar rim around the edge of the part $d$ of the case, and the conical edge of the part $c$ of the case sits within the rim of the diaphragm. The parts are to be held together and heated while solder is run into the joint until it shows around the inside of the conical portion $c$ at its junction with the diaphragm.

The alcohol, mixed with rosin or any suitable material that will easily expand by heat, is filled into the chamber $b$ through a hole that is tightly closed by the screw-plug $h$, or equivalent device.

The screw at $l$ is a convenient and preferable means for attaching the case $c$ to the coupling or T of the pipes $t$ $u$, and there is a pipe, $s$, passing from the coupling toward the center of the diaphragm, and terminating near the same as a valve-seat. The surface of the diaphragm itself forms the valve that closes against the end of the pipe; or a conical valve may be inserted in the end of the pipe $s$ and closed by the action of the diaphragm.

When the parts are cool the air and any water of condensation are free to pass in the direction of the arrows, and escape from the end of the tube $s$, and thence go off by the pipe $t$; but when the diaphragm is heated by the contact of hot water or steam, the contents of the chamber $b$, expanding, press the flexible diaphragm toward the end of the pipe $s$, closing or partially closing the escape, and the contents of the chamber $b$ will cool easily when the diaphragm is not heated. Hence the trap is very sensitive to changes of temperature.

It will be apparent that this trap may be placed at a T or elbow in the pipe, as seen in Fig. 1, or upon a shell or coupling similar to that of a globe-valve, as seen in Fig. 2, so as to project from a line-pipe, and the trap itself may be above the pipe, at the side of the same, or beneath it, according to the circumstances of use.

The pipe $s$ is represented within an annular opening in the case $c$. This mode of construction facilitates the construction of the tap in a lathe.

I claim as my invention—

1. In a steam-trap, an expansion-chamber formed of a flexible diaphragm and an external case extending from one edge of the diaphragm to the other, in combination with a pipe the end of which is adjacent to the diaphragm, substantially as and for the purposes set forth.

2. The flexible diaphragm $e$, the case $d$, and the case $c$, united together at their edges, substantially as shown, and forming the escape-chamber $a$ and expansion-chamber $b$, in combination with the pipe $s$, substantially as set forth.

3. The pipe $s$, for the discharge of the air or water of condensation, secured at one end into a coupling or T, and forming a valve-seat at the other end, in combination with a flexible diaphragm, the inclosing-case $c\ d$, and the expansible material within the chamber $b$, substantially as set forth.

Signed by me this 26th day of August, 1878.

L. P. HAWES.

Witnesses:
  THOS. CROCKER,
  G. W. EICHELL.